US012552542B2

(12) United States Patent
Blodgett et al.

(10) Patent No.: US 12,552,542 B2
(45) Date of Patent: Feb. 17, 2026

(54) AIRCRAFT WITH A FUSELAGE ACCOMMODATING AN UNDUCTED TURBINE ENGINE

(71) Applicant: GENERAL ELECTRIC COMPANY, Evendale, OH (US)

(72) Inventors: Keith Edward James Blodgett, Milford, OH (US); William J. Bowden, Cleves, OH (US); Egbert Geertsema, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/966,208

(22) Filed: Dec. 3, 2024

(65) Prior Publication Data

US 2025/0091721 A1   Mar. 20, 2025

Related U.S. Application Data

(63) Continuation-in-part of application No. 18/734,223, filed on Jun. 5, 2024, which is a continuation of application No. 17/835,280, filed on Jun. 8, 2022, now Pat. No. 12,030,652.

(51) Int. Cl.
| | |
|---|---|
| *B64D 27/14* | (2006.01) |
| *B64C 1/26* | (2006.01) |
| *B64D 27/40* | (2024.01) |
| *B64D 29/06* | (2006.01) |
| *B64D 35/02* | (2024.01) |

(52) U.S. Cl.
CPC .............. *B64D 27/14* (2013.01); *B64C 1/26* (2013.01); *B64D 27/40* (2024.01); *B64D 29/06* (2013.01); *B64D 35/02* (2013.01)

(58) Field of Classification Search
CPC ............ B64D 27/14; B64D 27/20; B64C 1/26
See application file for complete search history.

(56) References Cited

U.S. PATENT DOCUMENTS

| | | | |
|---|---|---|---|
| 2,532,753 | A | 12/1950 | Beman |
| 2,581,625 | A | 1/1952 | Brady |
| 2,929,586 | A | 3/1960 | Hurd, Jr. et al. |
| 3,618,699 | A | 11/1971 | Evans et al. |
| 4,917,336 | A | 4/1990 | Jacobs et al. |
| 4,953,812 | A | 9/1990 | Van Der Hoeven |
| 4,976,396 | A | 12/1990 | Carlson et al. |
| 5,551,649 | A | 9/1996 | Kaptein |

(Continued)

FOREIGN PATENT DOCUMENTS

| | | |
|---|---|---|
| CN | 105715313 A | 6/2016 |
| EP | 3187411 A1 | 7/2017 |

(Continued)

*Primary Examiner* — Nicholas McFall
*Assistant Examiner* — Eric Acosta
(74) *Attorney, Agent, or Firm* — Dority & Manning, P.A.

(57) ABSTRACT

An aircraft comprising a fuselage and an unducted turbine engine. The fuselage having a divot with an upstream edge and a downstream edge. The divot is defined by a straight reference line having a length (L) and a maximum depth (h) relative to the straight reference line. The unducted turbine engine having an engine core, a nacelle, and a set of blades. A first flow ratio (FR1) is equal to:

$$\frac{h}{L}.$$

20 Claims, 7 Drawing Sheets

(56) References Cited

U.S. PATENT DOCUMENTS

| | | |
|---|---|---|
| 5,988,568 A | 11/1999 | Drews |
| 6,463,870 B2 | 10/2002 | Beato et al. |
| 6,478,253 B1 | 11/2002 | Seidel |
| 7,739,865 B2 | 6/2010 | Prasad et al. |
| 8,256,709 B2 | 9/2012 | Negulescu |
| 8,302,912 B2 | 11/2012 | Wood |
| 8,967,967 B2 | 3/2015 | Stretton et al. |
| 9,334,045 B2 | 5/2016 | Wood |
| 9,387,923 B2 | 7/2016 | Stretton et al. |
| 9,463,870 B2 | 10/2016 | Wood |
| 9,630,702 B2 | 4/2017 | Alonso-Miralles et al. |
| 9,725,155 B2 | 8/2017 | Miller et al. |
| 10,399,664 B2 | 9/2019 | Bowden et al. |
| 10,714,069 B1 | 7/2020 | Ratner |
| 10,723,434 B2 | 7/2020 | Gruber et al. |
| 10,829,206 B2 | 11/2020 | Wood et al. |
| 10,907,495 B2 | 2/2021 | Breeze-Stringfellow et al. |
| 2005/0274103 A1 | 12/2005 | Prasad et al. |
| 2007/0272796 A1 | 11/2007 | Stuhr |
| 2009/0045287 A1 | 2/2009 | Belleville |
| 2009/0090811 A1 | 4/2009 | Llamas Sandin |
| 2010/0301171 A1 | 12/2010 | Wood |
| 2011/0277447 A1 | 11/2011 | Sturmer |
| 2015/0086335 A1 | 3/2015 | Merlo et al. |
| 2015/0125268 A1 | 5/2015 | Koopmann et al. |
| 2015/0360790 A1 | 12/2015 | Rouyre |
| 2015/0361885 A1 | 12/2015 | Romano et al. |
| 2016/0305271 A1 | 10/2016 | Schmidt et al. |
| 2017/0152019 A1 | 6/2017 | Wood et al. |
| 2018/0258856 A1 | 9/2018 | Schwarz et al. |
| 2019/0061963 A1 | 2/2019 | Sankrithi |
| 2019/0225318 A1 | 7/2019 | Ramakrishnan et al. |

FOREIGN PATENT DOCUMENTS

| | | | |
|---|---|---|---|
| EP | 2452877 B1 | 3/2018 | |
| FR | 2949754 A1 | 3/2011 | |
| FR | 3040366 A1 | 3/2017 | |
| JP | S62194993 A | 8/1987 | |
| JP | H08188192 A | 7/1996 | |

AIRCRAFT WITH A FUSELAGE ACCOMMODATING AN UNDUCTED TURBINE ENGINE

CROSS REFERENCE TO RELATED APPLICATIONS

This application is a continuation-in-part of U.S. patent application Ser. No. 18/734,223, filed Jun. 5, 2024, which is a continuation of U.S. patent application Ser. No. 17/835,280, filed Jun. 8, 2022, now U.S. Pat. No. 12,030,652, issued Jul. 9, 2024, which are hereby incorporated by reference in their respective entireties.

TECHNICAL FIELD

The disclosure generally relates to an aircraft, and more specifically, to an aircraft having a fuselage that accommodates an unducted turbine engine.

BACKGROUND

Turbine engines are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The unducted turbine engine is arranged as an engine core comprising at least a compressor section, a combustor section, and a turbine section in axial flow arrangement and defining at least one rotating element or rotor and at least one stationary component or stator.

Turbine engines come in different configurations, such as a turboprop engine, which is a turbine engine that drives an aircraft propeller, a turbofan engine, which is a turbine engine with a fan upstream of the engine core, with both the fan and the engine core being received within a nacelle, and a propfan turbine engine, which is also called an unducted turbine engine. The unducted turbine engine includes aspects of both turboprop engine and the turbofan engine. For example, an unducted turbine engine include a set of rotating blades, or propellers, on the exterior of the engine casing similar to a turboprop, without the rotating blade being constrained within the nacelle. The lack of a nacelle or other casing surrounding the rotating blades of the fan section, lead to the name of an "unducted" fan or propfan engine.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION OF THE EMBODIMENTS

Figure 1:
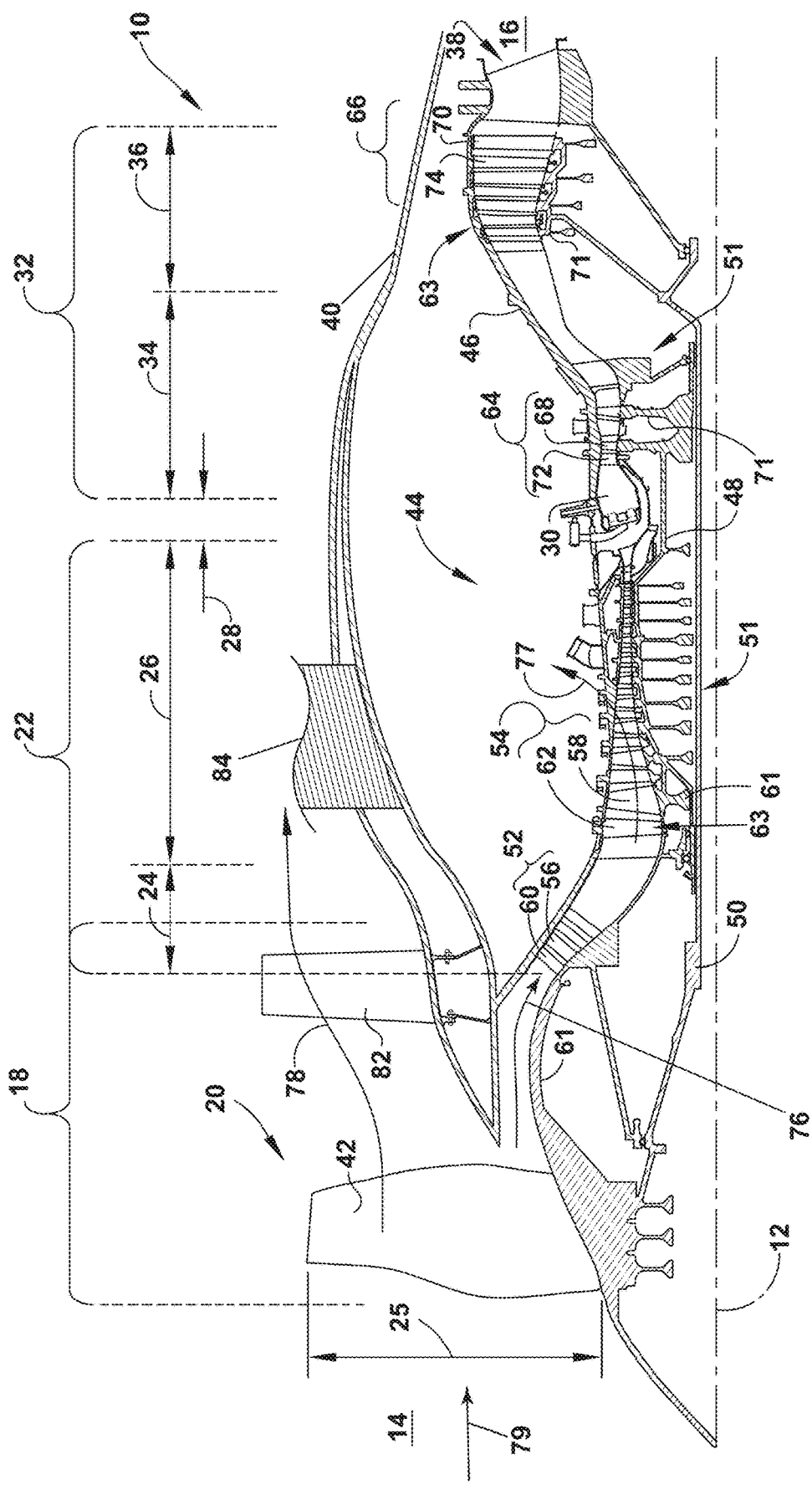
FIG. 1 is a schematic cross-sectional view of an unducted turbine engine.

The present disclosure relates to an aircraft including a fuselage that is shaped to accommodate an unducted turbine engine mounted directly to the fuselage, such as the empennage. An unducted turbine engine has exposed fan blades, which are not enclosed within an outer nacelle or fan duct Historically, unducted turbine engines, while more fuel efficient at commercial aircraft cruise speeds than ducted turbofan engines, have had other undesirable characteristics, such as comparatively loud noise levels The space between the unducted turbine engine and the fuselage acts as a nozzle that increases the local airflow speed through the exteriorly located fan blades, between the nacelle and the blade tips, with relation to a freestream airflow upstream of the unducted turbine engine. The annulus of air entering the blades between the outer surface of the nacelle and a swept circle defined by the blade tips is thought of as the "inlet airflow" to the blades. This acceleration of the inlet airflow to the blades negatively affects the fuel consumption of the unducted turbine engine. To counter, and even negate this acceleration, a divot is formed in the fuselage, at a location generally corresponding to the unducted turbine engine. The divot is shaped to control the speed of the inlet airflow such that the inlet airflow is the same or less than the freestream air speed. It has been found that by controlling the shape (depth, length, curvature) and location of the divot, in dependence on the type of unducted engine, one can advantageously control the local airspeed to improve engine performance.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within an unducted turbine engine or vehicle, and refer to the normal operational attitude of the unducted turbine engine or vehicle. For example, with regard to a unducted turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward means upstream and aft/rearward means downstream.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

"High" and "Low" as used herein are descriptors with regards to the performance indicator quantities described herein.

As used herein, the term "Mach number" will refer to the speed of a fluid around a body without the existing speed of the fluid. For example, in aviation an observed Mach number can be decreased or increased based on the wind speed and direction of the wind that the aircraft is flying in. In this case, the wind speed is defined as the existing speed of the fluid. In cases where the wind is a tail wind (e.g., flowing from tail to nose), the existing speed of the wind can be added to overall speed or Mach number of the aircraft. In cases where there is a head wind (e.g., flowing from nose to tail), the existing speed of wind can be subtracted to the overall speed or Mach number of the aircraft. The Mach number, as discussed herein, is assuming no tail wind or head wind (e.g., the existing speed is zero).

As used herein, the term "cruise speed" refers to a speed of a turbine engine powering an aircraft comprising when the aircraft operates at a cruising speed. The turbine engine operates at cruising speed during normal operating conditions when the aircraft levels after climbing to a specified altitude. A turbine engine may operate at a cruising speed that is from 50% to 90% of a rated speed (e.g., a maximum speed or a full throttle of the turbine engine), such as from 70% to 80% of the rated speed. In some embodiments, a cruising speed may be achieved at about 80% of full throttle, such as from about 50% to about 90% of full throttle, such as from about 70% to about 80% full throttle. As used herein, the term "cruise flight" refers to a phase of flight in which an aircraft levels in altitude after a climb phase and prior to descending to an approach phase. In various examples, cruise flight may take place at a cruise altitude up to approximately 65,000 ft. In certain examples, cruise altitude is between approximately 28,000 ft. and approximately 45,000 ft. In yet other examples, cruise altitude is expressed in flight levels (FL) based on a standard air pressure at sea level, in which cruise flight is between FL280 and FL650. In another example, cruise flight is between FL280 and FL450. In still certain examples, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another example, cruise altitude is between approximately 4.85 psia and approximately 2.14 psia. It should be appreciated that, in certain examples, the ranges of cruise altitude defined by pressure may be adjusted based on a different reference sea-level pressure and/or sea-level temperature. It will be appreciated that during normal operation of the aircraft, the aircraft does not deviate from cruise altitude. However, during some instances, such as to avoid oncoming weather conditions, the aircraft may climb or descend in altitude from cruise flight in order to avoid the oncoming weather conditions.

An unducted turbine engine is defined as a turbine engine having a set of circumferentially spaced fan blades, which extend, exteriorly, beyond a nacelle encasing an engine core. As used herein, the phrase "directly connected" refers to the immediate connection between two parts without a plurality of intervening parts therebetween. The unducted turbine engine is directly connected to an aircraft fuselage, tail wing, or wing by a pylon, which spaces the unducted turbine engine from the fuselage, wing, or an associated tail wing, resulting in a channel between the fuselage, wing or tail wing, respectively, and the unducted turbine engine.

During operation of the aircraft including the unducted turbine engine the freestream air flows over a portion of the fuselage and through the channel between the fuselage and the unducted turbine engine. At least a portion of the freestream airflow forms the inlet airflow, which flows through the annulus between the outer surface of the nacelle and the swept circle defined by the blade tips. The inlet airflow is ultimately used to generate a portion of an overall thrust of the unducted turbine engine. The channel acts as a nozzle that accelerates the inlet airflow.

The freestream airflow and the inlet airflow are both defined by respective Mach numbers. In a conventional aircraft (e.g., an aircraft including a fuselage formed without the divot as described herein), the acceleration of the inlet airflow causes the Mach number of the inlet airflow to be higher than the Mach number of the freestream airflow. This difference results in an undesirable increase of a Thrust Specific Fuel Consumption (TSFC) of the unducted turbine engine when compared to an instance where the Mach number of the freestream airflow is equal to or less than the Mach number of the inlet airflow. In other words, additional thrust and therefore fuel consumption is required to accommodate for the accelerated inlet airflow when compared to a scenario where the inlet airflow is not accelerated relative to the freestream Mach number. It is desirable to reduce the Mach number of the inlet airflow relative to the freestream airflow to reduce the TSFC with respect to an accelerated inlet airflow. It is desirable that the inlet airflow Mach number be equal to or less than the freestream Mach number.

One solution for controlling the Mach number of the inlet airflow (e.g., ensure that the inlet airflow does not accelerate) is to mount the unducted turbine engine further from the fuselage by extending the pylon that interconnects the unducted turbine engine and the fuselage of the aircraft. However, such extended pylons create additional structural problems related to the larger bending moments on the cantilevered pylon, which requires a more robust, and undesirably heavier, pylon. The addition of weight ultimately results in a heavier aircraft, which negatively affects the overall aircraft efficiency or performance, especially increasing the fuel consumption. The farther that the unducted turbine engine is extended from the fuselage centerline, the greater will be the force effects, such as a yawing moment, associated with a thrust generated by the unducted turbine engine. In instances where there are multiple unducted turbine engines on the aircraft, these force effects ultimately require larger control surfaces (more weight) to appropriately operate the aircraft in a single engine mode, if one engine were to shut down.

Another solution for controlling the inlet airflow Mach number is to provide a divot along the fuselage near the unducted turbine engine, without increasing the distance the unducted turbine engine is spaced from the fuselage centerline. Indeed, it was found that the size of a divot, the shape of the divot, and the positioning of the divot with respect to the unducted turbine engine results in the desired control of the inlet airflow.

The process of designing a divot and the relative spacing of the unducted turbine engine and the divot, however, requires the formation of models or the use of simulations in order to determine whether or not the divot and unducted turbine engine has the desired effect on the inlet airflow. This is an iterative, time consuming and costly process as the relative placement of the unducted turbine engine and the divot, along with the size of the divot, and selected based on an educated guess, and then the Mach number of the inlet airflow calculated using the models and simulations, to assess the performance of the divot. If the educated guess does not yield the desired performance result, the educated guess is updated and the iteration is repeated.

The inventors' practice has proceeded in the foregoing manner of designing an aircraft to include a divot in the fuselage of an aircraft with an unducted turbine engine, designing at least one of the fuselage, the divot and the unducted turbine engine, followed by several redesigns of the fuselage, the divot and the unducted turbine engine to arrive at a desired control of the Mach number of the inlet airflow, then calculating and checking the amount of fuel burn and thrust, and repeating the process, etc. during the design of several different aircrafts and unducted turbine engines.

More specifically, the inventors' practice has proceeded by making educated guesses on how various changes to defined geometric relationships between the unducted turbine engine, the divot, and other portions of the aircraft, such as a tail wing, would affect the Mach number of the inlet airflow. To determine the inlet airflow Mach number, tests were conducted using models or simulations, such as Computational Fluid Dynamics (CFD) models, and/or the building of physical prototypes and testing properties in a wind tunnel.

It is desired to identify the geometric relationships between the unducted turbine engine, the divot, and other portions of the aircraft, such as a tail wing, which yield advantageous TSFC ranges for a particular aircraft construction and engine configuration. The desired geometric relationship would keep the inlet airflow Mach number within a desired range to achieve a desired TSFC operating range. In most cases, the desired range is where the inlet airflow Mach number is less than the freestream Mach number. It would also be desirable to arrive at this advantageous dimensional sizing of a divot and spacing without having to go through the time consuming and iterative process. That is, it is desirable to establish conditions or limitations on the aircraft including the unducted turbine engine that account for the acceleration of the inlet airflow and the overall efficiency or robustness of the unducted turbine engine.

FIG. 1 is a schematic cross-sectional diagram of a turbine engine, specifically an unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The unducted turbine engine 10 as described herein is meant as a non-limiting example, and other architectures are possible, such as, but not limited to, the steam turbine engine, the supercritical carbon dioxide turbine engine, or any other suitable turbine engine.

An exterior surface, defined by a nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

A HP shaft or spool 48 disposed coaxially about the engine centerline 12 of the unducted turbine engine 10 drivingly connects the HP turbine 34 to the HP compressor 26. A LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which collectively define a rotor 51.

It will be appreciated that the unducted turbine engine 10 is either a direct drive or integral drive engine utilizing a reduction gearbox coupling the LP shaft 50 to the fan 20. In some embodiments this gearbox has a gear ratio of 4:1 or greater, for example, between 4:1 and 10:1 and between 5:1 and 9:1. In some embodiments the engine 10 has a disk loading (defined as horsepower over swept area of the fan blades 42) of between 60 and 150 HP/ft$^2$ and advance ratio above 3.8, as this term is defined in US20210108572, herein incorporated by reference. The unducted turbine engine 116 preferable operates at a cruise speed Mach number of greater than or equal to 0.75 and less than or equal to 0.85, greater than or equal to 0.55, or greater than or equal to 0.75 and less than or equal to 0.85 depending on mission requirements.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The static turbine vanes 72, 74 for a stage of the compressor are be mounted to the engine casing 46 in a circumferential arrangement.

Complementary to the rotor portion, the stationary portions of the unducted turbine engine 10, such as the static vanes 60, 62, 72, 74 among the compressor and turbine sections 22, 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

During operation of the unducted turbine engine 10, a freestream airflow 79 flows against a forward portion of the unducted turbine engine 10. A portion of the freestream airflow 79 enters an annular area 25 defined by the swept area between the outer surface of the nacelle and the tip of the blade, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42 and over the nacelle 40 of the unducted turbine engine 10. Subsequently, the inlet airflow 78 flows over at least a portion of the set of stationary fan vanes 82, which directs the inlet airflow 78 such that it is transverse toward the engine centerline 12. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air (e.g., from the compressor section 22). The bleed air provides an airflow to engine components requiring cooling. The temperature of the working airflow 76 exiting the combustor 30 is significantly increased with respect to the working airflow 76 within the compressor section 22. As such, cooling provided by the bleed air is necessary for operating of such engine components in the heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
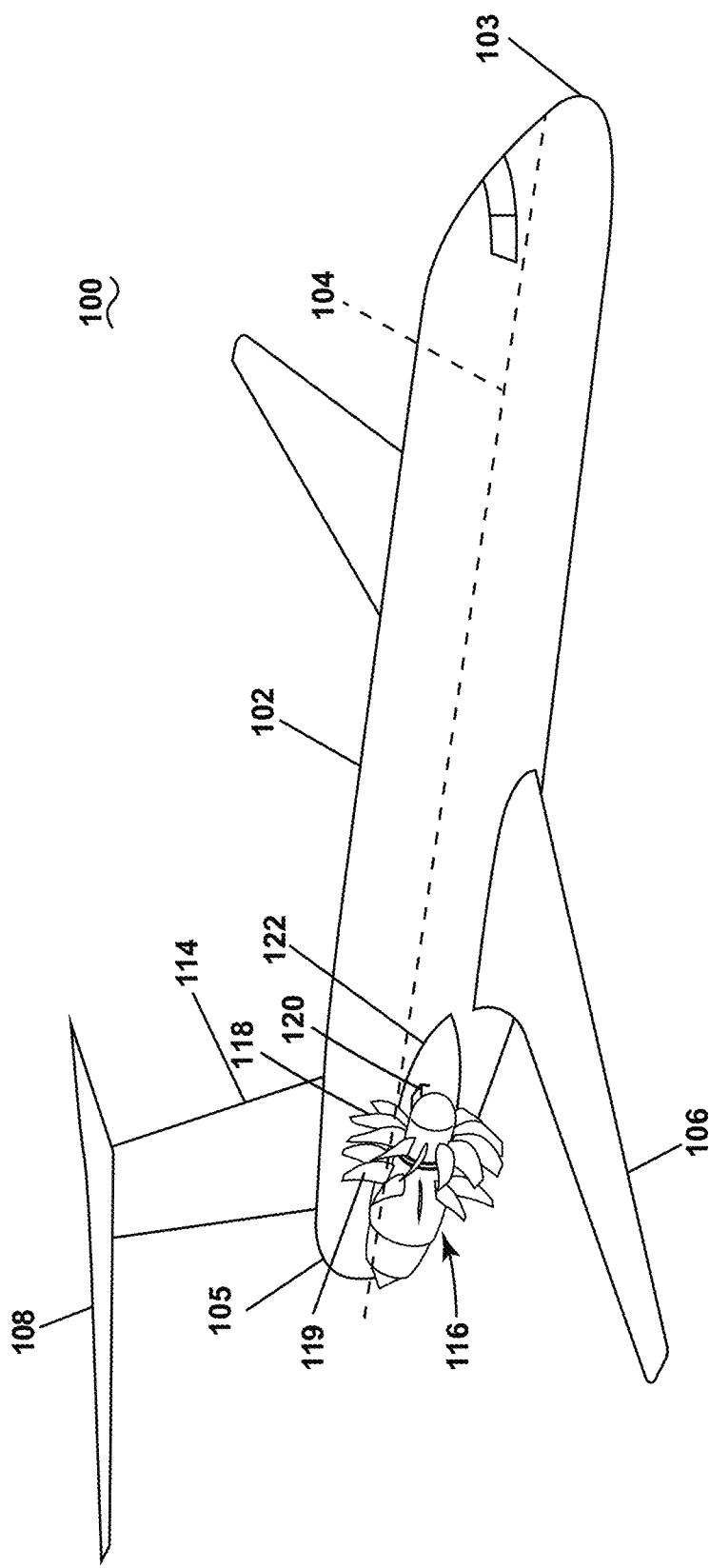
FIG. 2 is a schematic perspective view of an aircraft including an unducted turbine engine suitable for use as the unducted turbine engine of FIG. 1, with the unducted turbine engine mounted to an aircraft fuselage having a divot.

FIG. 2 is a schematic perspective view of an aircraft 100 including a generic unducted turbine engine 116 suitable for use as the unducted turbine engine 10 of FIG. 1. The aircraft 100 includes a fuselage 102 with an exterior surface. At least one wing 106 and a tail wing 108 extend from the fuselage. The tail wing 108 is operably coupled to and spaced from the fuselage 102 via a tail wing pylon 114. The unducted turbine engine 116 is operably coupled to the exterior surface of the fuselage 102 via a pylon 120. The unducted turbine engine 116 includes a set of circumferentially spaced fan blades 118. A set of stationary vanes 119 is provided downstream of the set of circumferentially spaced fan blades 118. The fuselage 102 extends between a nose 103 and a tail 105 and includes a fuselage centerline 104 extending therebetween. A divot 122 is formed along a portion of the exterior surface of the fuselage 102 near the unducted turbine engine 116. While illustrated as a single unducted turbine engine 116 and a single divot 122, it will be appreciated that there can be any number of unducted turbine engines 116 coupled to a variety of suitable portions of the fuselage 102, the at least one wing 106 or the tail wing 108. Further, there can be any number of one or more divots 122 provided about the exterior surface of the fuselage 102.

It will be further appreciated that the unducted turbine engine 116 is able to be operably coupled to a variety of aircraft 100 fuselage 102 that have the divot 122. Additionally, while the tail wing 108 is a T-wing tail wing (e.g., the tail wing 108 as illustrated), other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 108.

Figure 3:
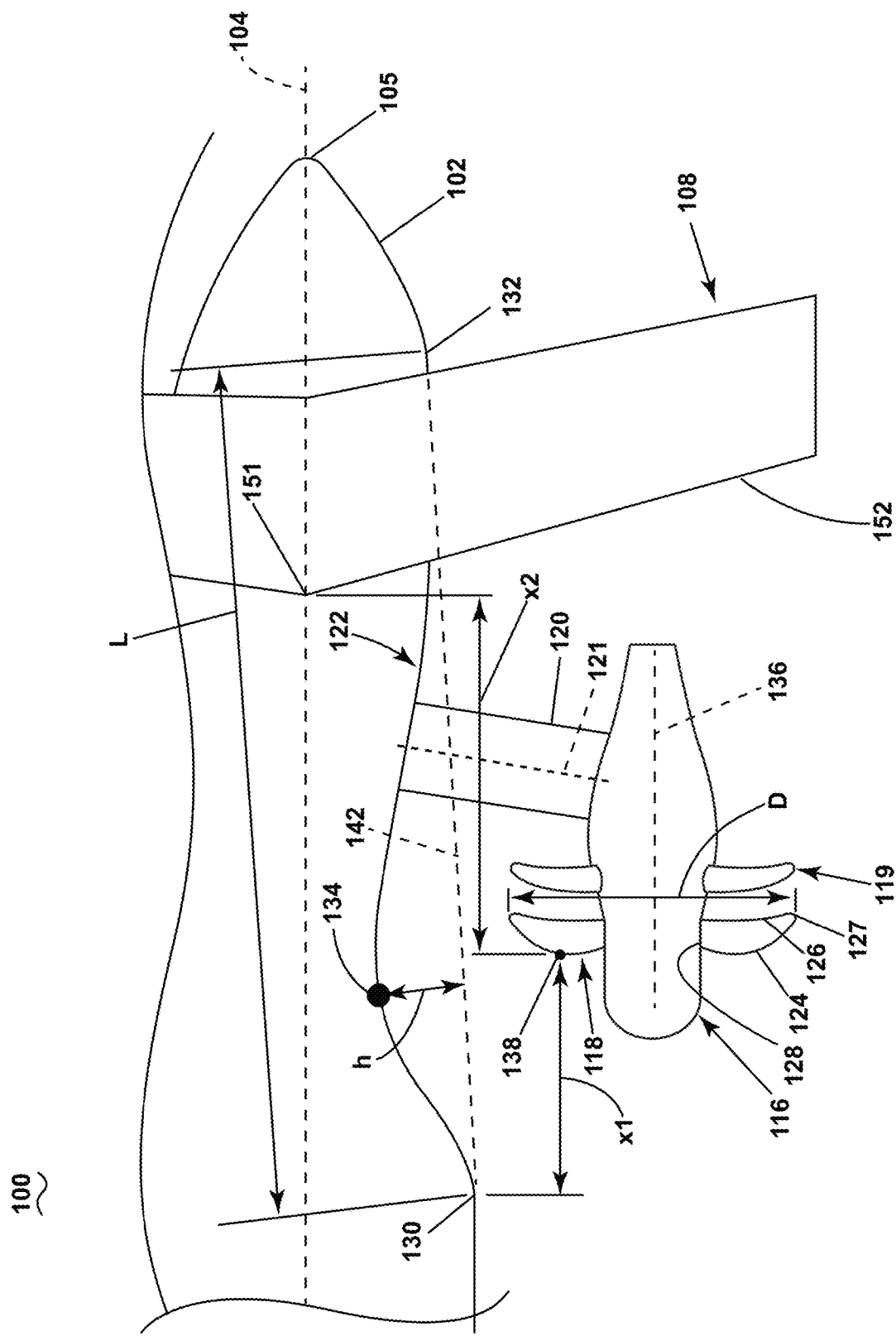
FIG. 3 is a top-down view of the aircraft as seen from a horizontal plane above the aircraft of FIG. 2.

FIG. 3 is a top-down view of a portion of the aircraft 100 as viewed from a horizontal plane above the aircraft 100. The divot 122 extends from an upstream edge 130 to a downstream edge 132. The divot 122 forms a depression in the otherwise normal shape of the fuselage 102. The physical relationship between the divot 122 and the unducted turbine engine 116 is quantified by using a set of geometric relationships.

As it moves axially, relative to the fuselage centerline, the divot 122 converges radially inwardly from the upstream edge 130 to a maximum depth 134, and then diverges radially outwardly from the maximum depth 134 to the downstream edge 132. The rate of convergence to the maximum depth 134 or rate of divergence from the maximum depth need not be the same, and need not be constant. As can be seen, the divot 122 converges to the maximum depth 134 at a first rate or slope, and diverges from the maximum depth 134 at a second rate or slope, which is different from the first rate or slope. The divot 122 is non-symmetric or symmetric about a vertical plane normal to the horizontal plane as viewed in FIG. 2, with the vertical plane intersecting the maximum depth 134. The divot 122 includes a variety of suitable shapes and sizes. The upstream edge 130 and the downstream edge 132 are be provided along a variety of suitable portions of the fuselage 102.

The unducted turbine engine 116 is operably coupled to a suitable location along the fuselage 102 via the pylon 120. As illustrated, the pylon 120 is coupled to a portion of the fuselage 102 defined by the divot 122. Alternatively, the pylon 120 is coupled to a portion of the fuselage 102 not defined by the divot 122. The pylon 120 is defined by a pylon centerline 121 extending between a portion of the pylon 120 coupled to the fuselage 102 and a portion of the pylon 120 coupled to the unducted turbine engine 116.

The unducted turbine engine 116 is defined by an engine centerline 136. Each fan blade of the set of circumferentially spaced fan blades 118 extends between a leading edge 124 and a trialing edge 126 in the axial direction with respect to the engine centerline 136 and between a root 128 and a tip 127 in the radial direction with respect to the engine centerline 136. Each fan blade of the set of circumferentially spaced fan blades 118 meet with an exterior portion (e.g., a nacelle) of the unducted turbine engine 10 at the root 128. The engine centerline 136 is parallel or non-parallel to the fuselage centerline 104 when viewed along a horizontal plane extending along the fuselage centerline 104.

A straight reference line 142, when viewed from the horizontal plane of FIG. 3, connects the upstream edge 130 and the downstream edge 132 of the divot 122. The straight reference line 142 has a length (L).

A given axial point along the divot 122 has a depth or height that is defined by a line perpendicular to the straight reference line 142 and intersecting the divot 122. A maximum height (h) occurs at the maximum depth 134.

The tip 127 of each fan blade of the set of circumferentially spaced fan blades 118 is provided a radial distance from the engine centerline 136. During rotation, the set of circumferentially spaced fan blades 118 sweep an area to define a circle with a diameter (D).

The set of circumferentially spaced fan blades 118 include an axially forwardmost point 138 when viewed along a horizontal plane extending along the engine centerline 136 and intersecting the set of circumferentially spaced fan blades 118. A first distance (x1) is defined as the distance, along a line parallel to the fuselage centerline 104, between the axially forwardmost point 138 and the upstream edge 130 of the divot 122.

The tail wing 108 includes a leading edge 152 defining an axially forward edge of the tail wing 108 with respect to the fuselage centerline 104. As illustrated, the downstream edge 132 of the divot 122 is axially aft of, fore of, or coincide with the leading edge 152 of the tail wing 108 with respect to the fuselage centerline 104. A second distance (x2) is defined as the distance, along a line parallel to the fuselage centerline 104, between an axially forwardmost point 151 of the leading edge 152 of the tail wing 108 and the axially forwardmost point 138 of the set of circumferentially spaced fan blades 118.

In one implementation, the unducted turbine engine 116 is axially positioned, with respect to the fuselage centerline 104, along the fuselage 102 to correspond with the location of the divot 122. The unducted turbine engine 116 is positioned such that the axially forwardmost point 138 is axially aft of or coincides with the maximum depth 134.

Figure 4:
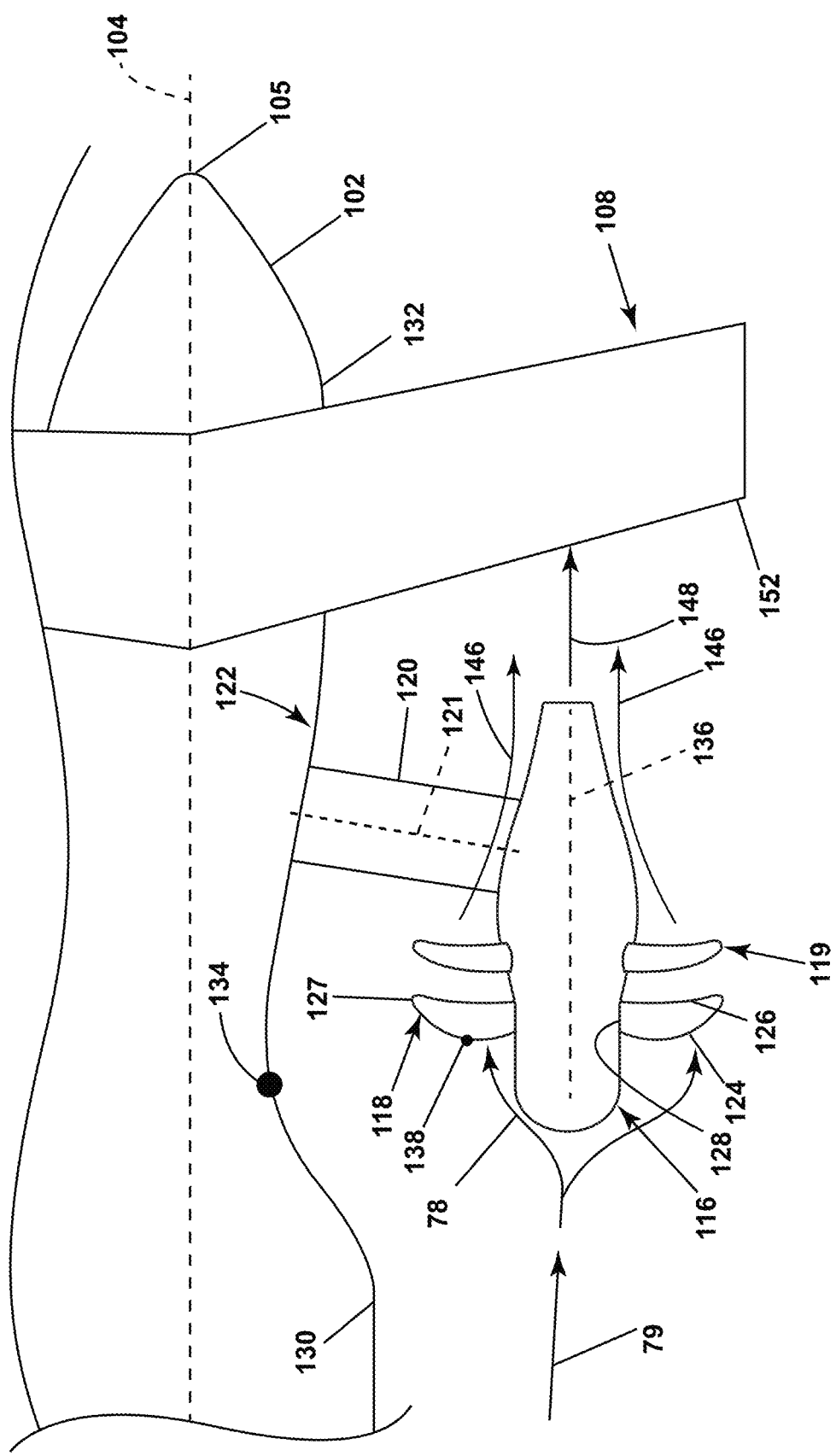
FIG. 4 is the same view of the aircraft as shown in FIG. 3, and further illustrating a freestream airflow along with an inlet airflow during operation of the aircraft.

FIG. 4 is the same view as FIG. 3 and illustrates the airflows during the operation of the aircraft 100 and unducted turbine engine 116. During operation of the aircraft 100, a freestream airflow 79 flows over the fuselage 102. A portion of the freestream airflow 79 flows over and into the annulus defined between the annular area swept by the set of blades from the nacelle to the tips to form the inlet airflow 78. The inlet airflow 78 defines a first thrust airflow 146, while the working airflow defines a second thrust airflow 148, with the first and second thrust airflows 146, 148 defining an overall thrust of the unducted turbine engine 116.

The speed of the freestream airflow 79 is defined by a freestream airflow Mach number (Mf) and the speed of the inlet airflow 78 is defined by an inlet airflow Mach number (Mi).

Figure 5:
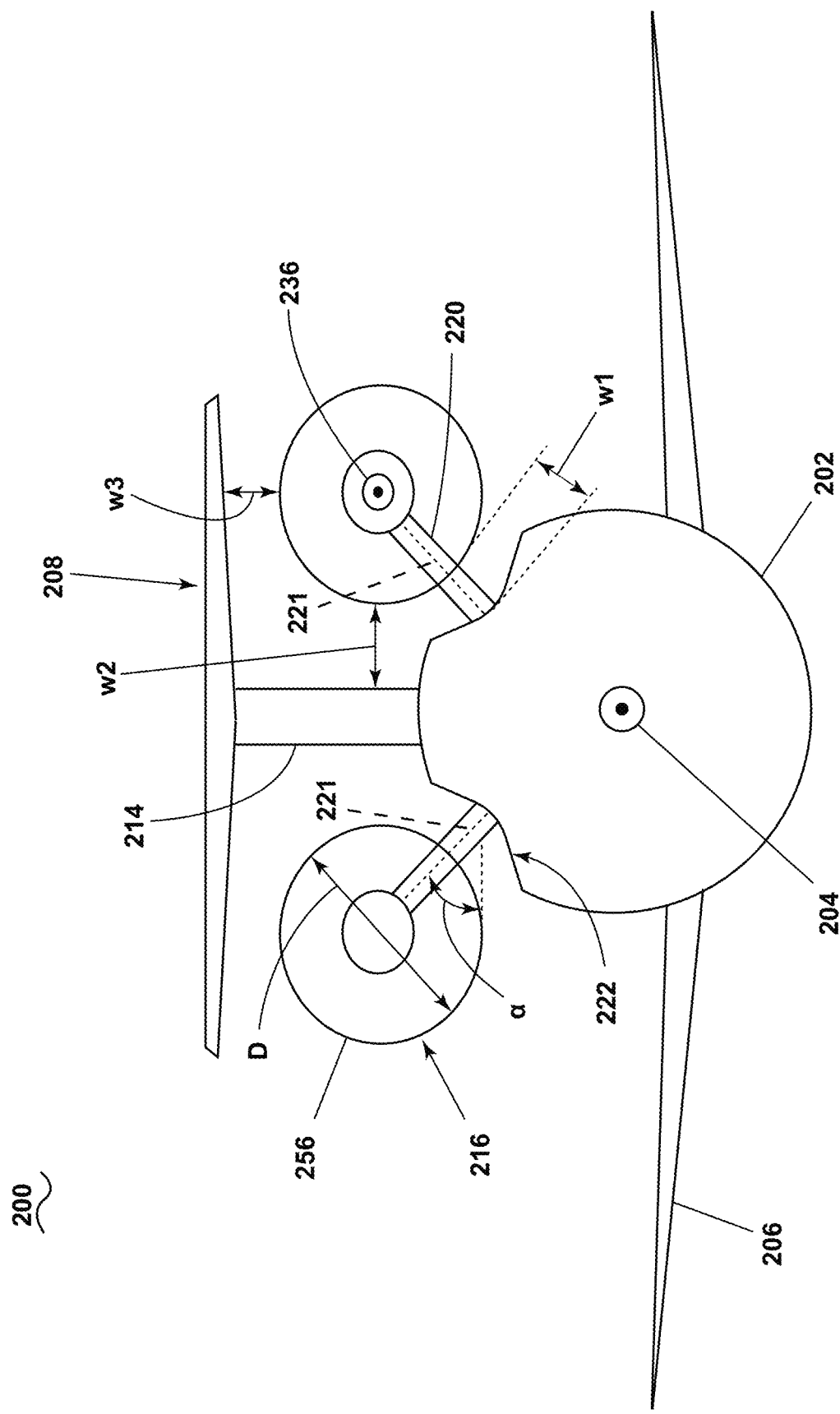
FIG. 5 is a schematic front view of an exemplary aircraft suitable for use as the aircraft of FIG. 2, viewed from a vertical plane in front of the aircraft, and further illustrating additional geometric characteristics of the aircraft.

FIG. 5 is a front view of an aircraft 200, suitable for use as the aircraft 100 of FIG. 2, as viewed from a vertical plane. The aircraft 200 is similar to the aircraft 100, therefore, like parts will be identified with like numerals increased to the 200 series, with it being understood that the description of the like parts of the aircraft 100 applies to the aircraft 200 unless otherwise noted.

The aircraft 200 includes a fuselage 202 with a fuselage centerline 204. A pair of wings 206 extend from the fuselage 202. A tail wing pylon 214 operably couples a tail wing 208 to the fuselage 202. At least one divot 222 is formed along the fuselage 202. Two unducted turbine engines 216 are spaced from the fuselage 202. Each unducted turbine engine 216 is operably coupled to the fuselage 202 via a respective pylon 220. The pylon 220 is defined by a pylon centerline 221. Each unducted turbine engine 216 is defined by an engine centerline 236. While not illustrated, each unducted turbine engine 216 includes a set of circumferentially arranged fan blades that define a swept area defining a circle 256 having a diameter (D). A boundary of the circle 256 corresponds to at least one tip of the set of circumferentially arranged fan blades.

The aircraft 200 includes two unducted turbine engines 216, one on each side of the fuselage 202. The pylon 220 couples the unducted turbine engine 216 to a portion of the fuselage 202 corresponding to the divot 222. The pylon 220 extends from the fuselage 202 at a roll angle ($\alpha$) formed between the pylon centerline 221 and a horizontal plane. The roll angle ($\alpha$) is greater than or equal to 0 degrees and less than or equal to 45 degrees ($0° \leq \alpha \leq 45°$). It will be appreciated that the roll angle ($\alpha$) can be a negative angle such that the roll angle is greater than or equal to −45 degrees and less than or equal to 0 degrees ($-45° \leq \alpha \leq 0°$).

A first radial distance (w1) is defined as the distance along the pylon centerline 221 between the boundary of the circle 256 and the fuselage 202 when viewed in the vertical plane of FIG. 5. A second radial distance (w2) is defined as the shortest radial distance between the exterior of the tail wing pylon and boundary of the circle 256 along a horizontal line passing through engine centerline 236 when viewed in the vertical plane of FIG. 5. A third radial distance (w3) is defined as the shortest radial distance between the boundary of the circle 256 and the exterior surface of the tail wing 208 along a radial line extending from the engine centerline 236, when viewed in the vertical plane of FIG. 5.

With reference to FIGS. 2-5, TABLES I-III disclose several embodiments of the unducted turbine engine 116, 216, with different mounting locations and different sizes for the divot 122, 222. The embodiments in TABLES I-III illustrate the values for the various geometric characteristics used to quantify the physical relationship between the divot 122, 222 and the unducted turbine engine 116, 216, respectively, along with the corresponding range of inlet airflow Mach numbers (Mi) for the simulated freestream Mach number (Mf).

In Table I, the diameter (D) is held constant for embodiments 1-6 at 3 m, at 5 m for embodiment 5, and at 10 m for embodiment 8 while the other physical characteristics (e.g., the first distance (x1) and the length (L) and the height (h)) are varied, as well as the freestream airflow Mach number (Mf) being varied. The corresponding inlet airflow Mach number (Mi) range according to the simulation is shown. The measurements in the TABLES below are in meters (m).

TABLE I

| Embodiment | D (m) | x1 (m) | L (m) | h (m) | Mf | Mi |
|---|---|---|---|---|---|---|
| 1 | 3.0 | 1.5 | 6.0 | 0.06 | 0.55 | 0.45-0.549 |
| 2 | 3.0 | 2.7 | 6.0 | 0.72 | 0.55 | 0.45-0.549 |
| 3 | 3.0 | 3.6 | 7.5 | 0.75 | 0.65 | 0.55-0.649 |
| 4 | 3.0 | 4.68 | 9.0 | 0.72 | 0.75 | 0.65-0.749 |
| 5 | 3.0 | 5.78 | 10.5 | 0.74 | 0.85 | 0.75-0.849 |
| 6 | 3.0 | 9.0 | 12.0 | 2.0 | 0.85 | 0.75-0.849 |
| 7 | 5.0 | 15.0 | 20.0 | 3.0 | 0.95 | 0.85-0.949 |
| 8 | 10.0 | 4.0 | 6.0 | 0.9 | 0.95 | 0.85-0.949 |

It will be appreciated that the first distance (x1) is greater than or equal to 1.5 m and less than or equal to 15 m. The length (L) is greater than or equal to 6 m and less than or equal to 20 m. The height (h) is greater than or equal to 0.06 m and less than or equal to 3 m. The freestream airflow Mach number (Mf) is greater than or equal to 0.55 and less than or equal to 0.95. The inlet airflow Mach number (Mi) is greater than or equal to 0.45 and less than or equal to 0.949.

In Table II, the diameter D is held constant for embodiments 9-14 at 3.5 m and at 7.5 m for embodiments 15-17, while the physical characteristic x2 is varied, along with the freestream Mach number (Mf), which results in a corresponding inlet airflow Mach number (Mi) range.

TABLE II

| Embodiment | D (m) | x2 (m) | Mf | Mi |
|---|---|---|---|---|
| 9 | 3.5 | 1.5 | 0.55 | 0.45-0.549 |
| 10 | 3.5 | 2.45 | 0.55 | 0.55-0.549 |
| 11 | 3.5 | 2.8 | 0.65 | 0.55-0.649 |
| 12 | 3.5 | 3.15 | 0.75 | 0.65-0.749 |
| 13 | 3.5 | 3.5 | 0.85 | 0.75-0.849 |
| 14 | 3.5 | 7.0 | 0.95 | 0.85-0.949 |
| 15 | 7.5 | 7.5 | 0.55 | 0.45-0.549 |
| 16 | 7.5 | 11.25 | 0.75 | 0.65-0.749 |
| 17 | 7.5 | 15.0 | 0.95 | 0.85-0.949 |

It will be appreciated that second distance (x2) is greater than or equal to 1.5 m and less than or equal to 15 m.

In Table III, the diameter D was held constant for embodiments 18-23 at 3.2 m and at 5 m for embodiments 24-26, while the physical characteristics w1, w2, and w3 were varied, along with the freestream Mach number (Mf), resulting in the corresponding inlet airflow Mach number (Mi) range.

TABLE III

| Embodiment | D (m) | w1 (m) | w2 (m) | w3 (m) | Mf | Mi |
|---|---|---|---|---|---|---|
| 18 | 3.2 | 0.25 | 0.25 | 0.25 | 0.55 | 0.45-0.549 |
| 19 | 3.2 | 1.12 | 2.56 | 1.6 | 0.55 | 0.45-0.549 |
| 20 | 3.2 | 0.96 | 2.24 | 1.12 | 0.65 | 0.55-0.649 |
| 21 | 3.2 | 0.8 | 1.92 | 0.8 | 0.75 | 0.65-0.749 |
| 22 | 3.2 | 0.64 | 1.6 | 0.32 | 0.85 | 0.75-0.849 |
| 23 | 3.2 | 3.2 | 3.2 | 3.2 | 0.95 | 0.85-0.949 |
| 24 | 5.0 | 0.5 | 0.5 | 0.5 | 0.55 | 0.45-0.549 |
| 25 | 5.0 | 2.5 | 2.5 | 2.5 | 0.75 | 0.65-0.749 |
| 26 | 5.0 | 5.0 | 5.0 | 5.0 | 0.95 | 0.85-0.949 |

It will be appreciated that the first radial distance (w1) is greater than or equal to 0.25 m and less than or equal to 5 m. The second radial distance (w2) is greater than or equal to 0.25 m and less than or equal to 5 m. The third radial distance (w3) is greater than or equal to 0.25 m and less than or equal to 5 m.

In Table IV, the diameter D was held constant for embodiments 27 and 28 at 2 m and held constant for embodiments 29 and 30 at 10 m while the physical characteristics (e.g., the first distance (x1) and the length (L) and the height (h)) are varied, as well as the freestream airflow Mach number (Mf) being varied.

TABLE IV

| Embodiment | D (m) | x1 (m) | L (m) | h (m) | Mf | Mi |
|---|---|---|---|---|---|---|
| 27 | 2.0 | 1.5 | 6.0 | 0.6 | 0.65 | 0.55-0.649 |
| 28 | 2.0 | 5.0 | 10 | 1.5 | 0.95 | 0.85-0.949 |
| 29 | 10.0 | 2.5 | 10 | 0.5 | 0.75 | 0.65-0.749 |
| 30 | 10.0 | 15.0 | 20.0 | 2.0 | 0.85 | 0.75-0.849 |

It will be appreciated that the diameter (D) is greater than or equal to 2 m and less than or equal to 10 m. In all cases, the embodiments listed in TABLES I-IV result in an inlet airflow Mach number (Mi) range that is less than the freestream airflow Mach number (Mf). The inlet airflow Mach number (Mi) is reduced by between 0.001 and 0.1 with respect to the freestream airflow Mach number (Mf). The reduction of the inlet airflow Mach number (Mi) with respect to the corresponding freestream airflow Mach number (Mf) ultimately results in a decrease of the TSFC of the unducted turbine engine 116, 216 when compared to an aircraft where the inlet airflow Mach number (Mi) is greater than or equal to freestream Mach number (Mf) (e.g., Mi<Mf). It has been found that the reduction of the inlet airflow Mach number (Mi) with respect to the freestream airflow Mach number (Mf) results in an up to 5% decrease in the TSFC with respect to an aircraft where Mi>Mf.

Figure 6:
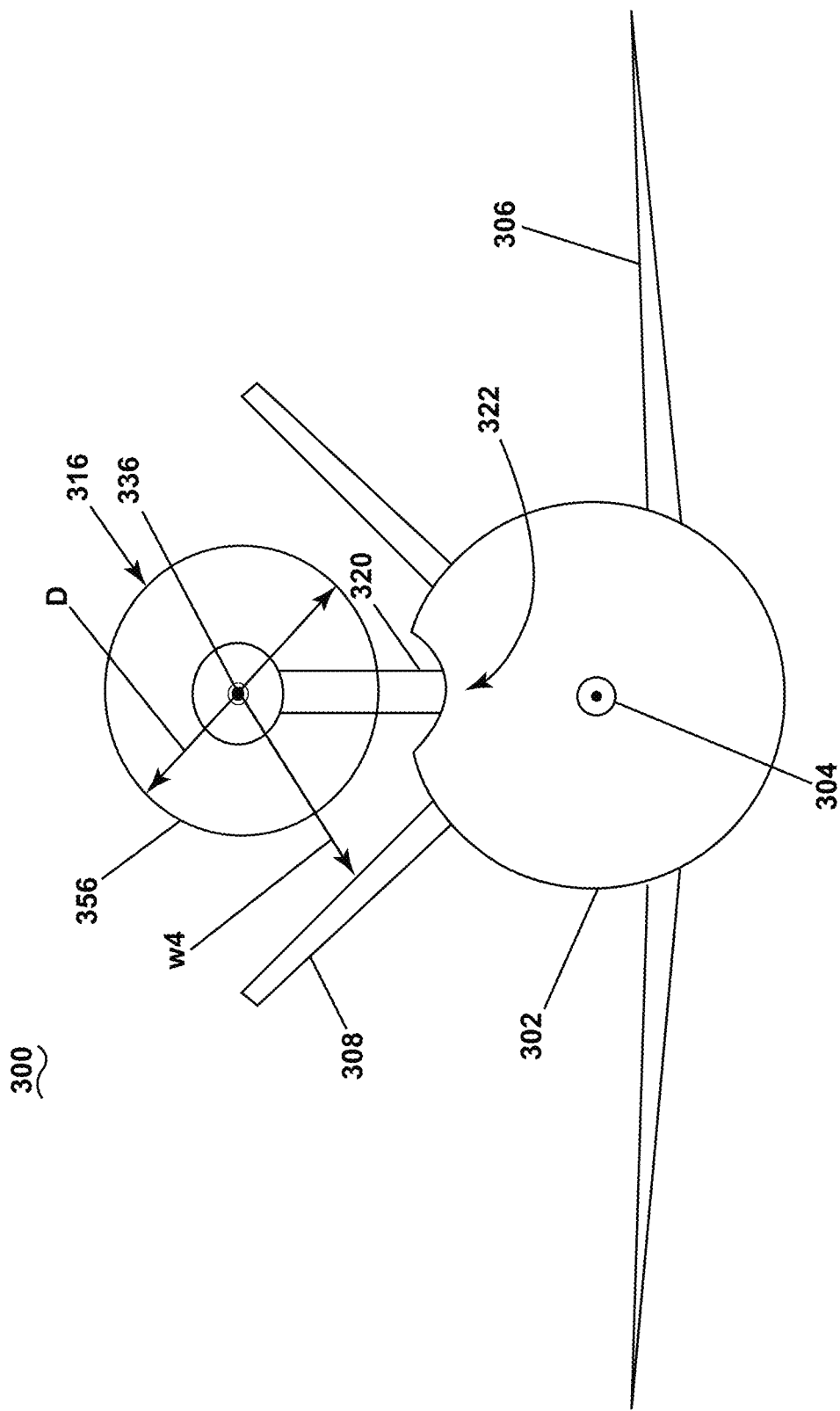
FIG. 6 is a front view of an alternative aircraft suitable for use as the aircraft of FIG. 2, viewed from a vertical plane, further illustrating a V-Tail and additional geometric characteristics of the aircraft.

FIG. 6 is a schematic front view, as seen through a vertical plane, of an aircraft 300 with an alternative tail section than that depicted in FIG. 2. The aircraft 300 is similar to the aircraft 100, 200, therefore, like parts will be identified with like numerals increased to the 300 series, with it being understood that the description of the like parts of the aircraft 100, 200 applies to the aircraft 300 unless otherwise noted.

The aircraft 300 includes a fuselage 302 extending between a nose (not illustrated) and a tail 305. The fuselage 302 is defined by a fuselage centerline 304. The aircraft has wings 306. An unducted turbine engine 316 defined by an engine centerline 336 is coupled to the fuselage 302 via a pylon 320. The unducted turbine engine 316 includes a set of circumferentially spaced fan blades 318, which, during rotation, sweep an area defining a circle 356 with a diameter (D). The fuselage 302 includes a divot 322.

The aircraft 300 includes the geometric characteristics described in terms of the aircraft 100 (FIGS. 2-4). The aircraft 300 further includes additional geometric characteristics that are used in tandem with or in place of the geometric characteristics of the aircraft 100 to determine an advantageous positioning and sizing of the divot 322 relative to the unducted turbine engine 316.

The aircraft 300 includes a tail wing 308 in a V-formation (a V-tail) extending from respective portions of the fuselage 302. The divot 322 and the unducted turbine engine 316 are each provided within the interior of the V-tail tail wing 308 with respect to the fuselage centerline 304.

A fourth radial distance (w4), which is useful for the V-formation tail wing 308, is defined as the shortest radial distance, with respect to the engine centerline 336, between an exterior of one tail of the tail wing 308 and the engine centerline 336, when viewed from a vertical plane looking down the engine centerline as seen in FIG. 6. The unducted turbine engine 116 is located in the middle of the two tails that define the tail wing 308, thus, the fourth radial distance (w4) is the same for each tail.

TABLE V discloses several embodiments of mounting of the unducted turbine engine 316 relative to a V-tail tail wing 308, the location of the divot 322, and the size of the divot 322. The diameter D is kept constant at 4.55 for embodiment 31, at 3.5 m for embodiments 32-35 and at 7.74 m for embodiments 36-38, while w4 is varied, along with the simulated freestream Mach number (Mf), which yields the corresponding inlet airflow Mach number (Mi) range.

TABLE V

| Embodiment | D (m) | w4 (m) | Mf | Me |
|---|---|---|---|---|
| 31 | 4.55 | 2.5 | 0.55 | 0.45-0.549 |
| 32 | 3.5 | 3.5 | 0.65 | 0.55-0.649 |
| 33 | 3.5 | 4.03 | 0.75 | 0.65-0.749 |
| 34 | 3.5 | 4.38 | 0.85 | 0.75-0.849 |
| 35 | 3.5 | 5.43 | 0.95 | 0.85-0.949 |
| 36 | 7.74 | 4.26 | 0.55 | 0.45-0.549 |
| 37 | 7.74 | 9.0 | 0.75 | 0.65-0.749 |
| 38 | 7.74 | 12.0 | 0.95 | 0.85-0.949 |

It is contemplated that the fourth radial distance (w4) is greater than or equal to 2.5 m and less than or equal to 12 m.

Figure 7:
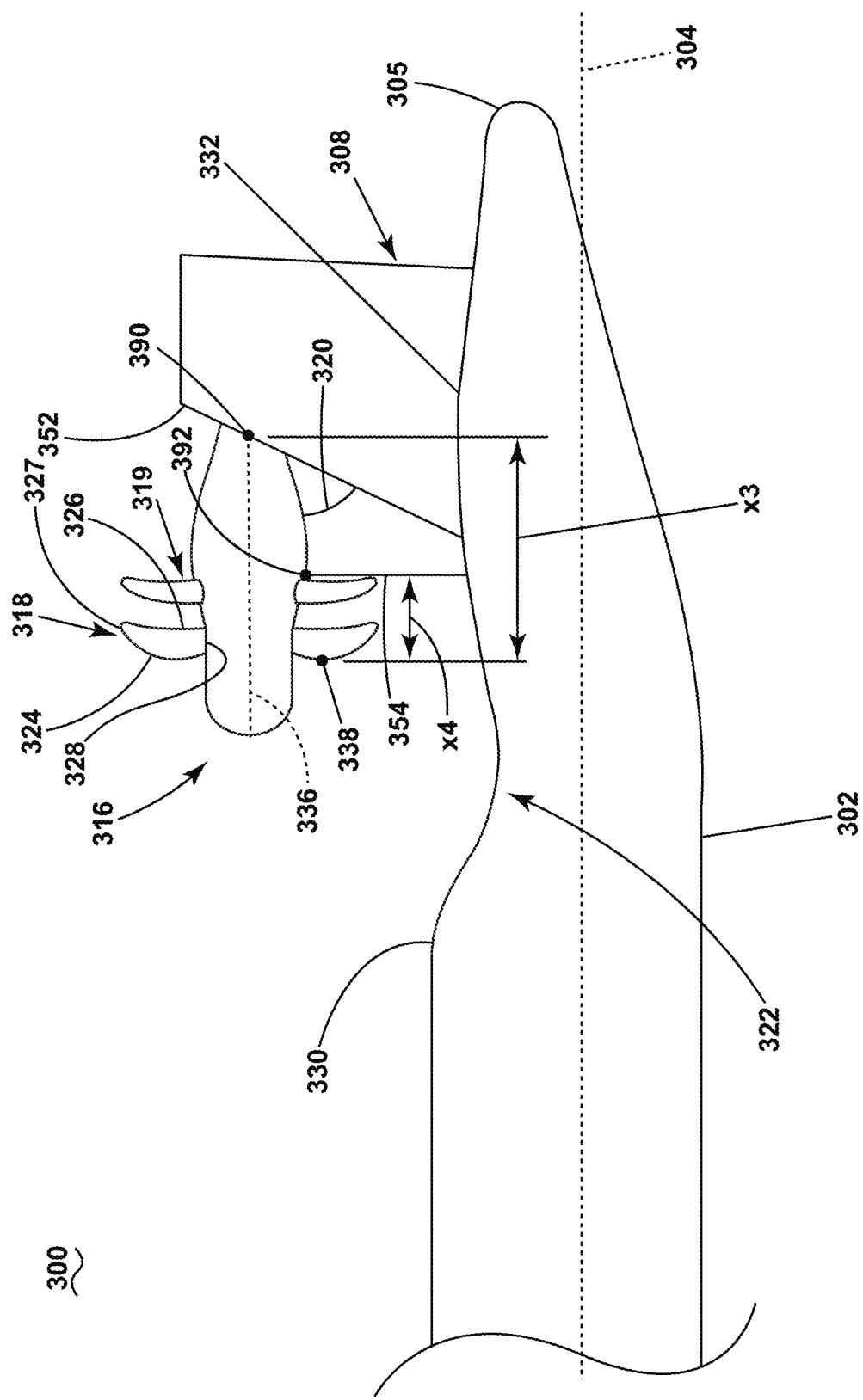
FIG. 7 is a side view of the aircraft of FIG. 6, viewed from a vertical plane, further illustrating additional geometric characteristics of the aircraft.

FIG. 7 is a schematic side view of the aircraft 300 of FIG. 6, when viewed from a vertical plane, which is parallel to the fuselage centerline 304, and further illustrating additional geometric characteristics. The divot 322 extends axially between an upstream edge 330 and a downstream edge 332 with respect to the fuselage centerline 304. The unducted turbine engine 316 includes a set of circumferentially spaced fan blades 318 that extend between a root 328 and a tip 327 and between a leading edge 324 and a trailing edge 326. A set of stationary vanes 319 are provided downstream of the set of circumferentially spaced fan blades 318. An axially forwardmost point 338 of the set of circumferentially spaced fan blades 318 defines a forwardmost portion of the circumferentially spaced fan blades 318 with respect to the fuselage centerline 304.

A third distance (x3) is defined as the axial distance, with respect to the engine centerline 336, between the axially forwardmost point 338 and a point 390 where the engine centerline 336 intersects a leading edge 352 of the tail wing 308, when viewed from the vertical plane of FIG. 7. A fourth distance (x4) is defined as the distance, along a line that is parallel to the engine centerline 336, between the axially forwardmost point 338 and a point 392 where a leading edge 354 of the pylon 320 intersects the unducted turbine engine 316.

TABLE VI discloses several embodiments of mounting of the unducted turbine engine 316 in a V-tail tail wing 308, the location of the divot 322, and the size of the divot 322. In TABLE VI, the diameter D is held constant at 2.5 m for embodiment 29, at 3.5 m for embodiments 40-45, at 8 m for embodiment 46, and at 10 m for embodiment 47, while x3 and x4 are varied, along with the simulated freestream Mach number (Mf), which results in the corresponding inlet airflow Mach number (Mi) range.

TABLE VI

| Embodiment | D (m) | x3 (m) | x4 (m) | Mf | Mi |
|---|---|---|---|---|---|
| 39 | 2.5 | 0.25 | 0.4 | 0.75 | 0.65-0.749 |
| 40 | 3.5 | 0.35 | 0.4 | 0.65 | 0.55-0.649 |

TABLE VI-continued

| Embodiment | D (m) | x3 (m) | x4 (m) | Mf | Mi |
|---|---|---|---|---|---|
| 41 | 3.5 | 0.7 | 0.53 | 0.55 | 0.45-0.549 |
| 42 | 3.5 | 1.4 | 0.88 | 0.65 | 0.55-0.649 |
| 43 | 3.5 | 2.1 | 1.23 | 0.75 | 0.65-0.749 |
| 44 | 3.5 | 2.8 | 1.58 | 0.85 | 0.75-0.849 |
| 45 | 3.5 | 3.5 | 1.75 | 0.95 | 0.85-0.949 |
| 46 | 8.0 | 6.0 | 4.0 | 0.85 | 0.75-0.849 |
| 47 | 10.0 | 10.0 | 4.0 | 0.85 | 0.75-0.849 |

It is contemplated that the third distance (x3) is greater than or equal to 0.25 m and less than or equal to 10 m. The fourth distance (x4) is greater than or equal to 0.4 m and less than or equal to 4 m.

During their work on the previously described embodiments, the inventors discovered relationships between the geometric characteristics of a divot and an unducted turbine engine configuration, which resulted in the desired freestream airflow Mach number (Mf) to inlet airflow Mach number (Mi) relationship yielding an improved TSFC without sacrificing overall thrust of the engine. This relationship between the engine, mounting and fuselage shaping near the engine resulted in an improved TSFC. The discovered relations are also beneficial to reduce reliance on the trial and error approach described earlier, thereby reducing time and costs.

The discovered relationships between certain geometric characteristics are used to obtain the desired inlet airflow Mach number (Mi), overall thrust of the turbine engine, and TSFC. These discovered relationships are quantified as specific flow ratios, or simply "FR".

These flow ratios are a first flow ratio (FR1), a second flow ratio (FR2) and a third flow ratio (FR3):

$$FR1 = \frac{h}{L}$$

$$FR2 = \frac{L}{D}$$

$$FR3 = \frac{x1}{L}$$

The first flow ratio (FR1) is greater than or equal to 0.01 and less than or equal to 0.15 (0.01≤FR1≤0.15). The first flow ratio (FR1) is used to determine the overall length (L) and height (h) of the divot.

The second flow ratio (FR2) is greater than or equal to 0.6 and less than or equal to 4 (0.6≤FR2≤4). The second flow ratio (FR2) is used to determine the overall length (L) of the divot or the sizing of the circumferentially spaced fan blades (e.g., the diameter (D)). For example, if the design of the aircraft requires the unducted turbine engine to have a set diameter (D), then the second flow ratio (FR2) is used to determine how long the divot needs to be to meet the required Mach number of the inlet airflow. With the length (L) set, the overall height (h) is picked through use of the first flow ratio (FR1). The third flow ratio (FR3) is greater than or equal to 0.25 and less than or equal to 0.75 (0.25≤FR3≤0.75). The third flow ratio (FR3) is used to axially locate the unducted turbine engine with respect to the upstream edge of the divot. For example, if the sizing of the divot (e.g., the length (L)), the positioning of the axially forwardmost point is determined by calculating the first distance (x1).

TABLE VII illustrates the first flow ratio (FR1), the second flow ratio (FR2) and the third flow ratio (FR3) for the embodiments in TABLE I.

TABLE VII

| Embodiment | D (m) | x1 (m) | L (m) | h (m) | Mf | Mi | FR1 | FR2 | FR3 |
|---|---|---|---|---|---|---|---|---|---|
| 1 | 3.0 | 1.5 | 6.0 | 0.06 | 0.55 | 0.45-0.549 | 0.01 | 2.0 | 0.25 |
| 2 | 3.0 | 2.7 | 6.0 | 0.72 | 0.55 | 0.45-0.549 | 0.12 | 2.0 | 0.45 |
| 3 | 3.0 | 3.6 | 7.5 | 0.75 | 0.65 | 0.55-0.649 | 0.1 | 2.5 | 0.48 |
| 4 | 3.0 | 4.68 | 9 | 0.72 | 0.75 | 0.65-0.749 | 0.08 | 3.0 | 0.52 |
| 5 | 3.0 | 5.78 | 10.5 | 0.74 | 0.85 | 0.75-0.849 | 0.07 | 3.5 | 0.55 |
| 6 | 3.0 | 9.0 | 12.0 | 2.0 | 0.85 | 0.75-0.849 | 0.133 | 4.0 | 0.75 |
| 7 | 5.0 | 15.0 | 20.0 | 3.0 | 0.95 | 0.85-0.949 | 0.15 | 4.0 | 0.75 |
| 8 | 10.0 | 4 | 6 | 0.9 | 0.95 | 0.85-0.949 | 0.15 | 0.6 | 0.67 |

The first flow ratio (FR1), the second flow ratio (FR2), and the third flow ratio (FR3) are used to position the unducted turbine engine with respect to the divot to achieve the desired inlet airflow Mach number (Mi) for a specific freestream airflow Mach number (Mf). Further, through the ratios described, various geometric characteristics of the divot and/or the unducted turbine engine are able to be calculated if one or more geometric characteristics are known. For example, if the size (e.g., the diameter (D)) of the unducted turbine engine is known, the second flow ratio (FR2) is able to be used to find the length (L) of the divot, which then allows for the calculation of the height (h) and the first distance (x1) through use of the first flow ratio (FR1) and the third flow ratio (FR3). This process is able to be done for each freestream airflow Mach number (Mf). A fourth flow ratio (FR4) is defined as follows:

$$FR4 = \frac{x2}{D}$$

The fourth flow ratio (FR4) is greater than or equal to 0.43 and less than or equal to 2 (0.43≤FR4≤2). In summary, TABLE VIII illustrates the fourth flow ratio (FR4) using the embodiments from TABLE II.

TABLE VIII

| Embodiment | D (m) | x2 (m) | Mf | Me | FR4 |
|---|---|---|---|---|---|
| 9 | 3.5 | 1.5 | 0.55 | 0.45-0.549 | 0.43 |
| 10 | 3.5 | 2.45 | 0.55 | 0.45-0.549 | 0.7 |
| 11 | 3.5 | 2.8 | 0.65 | 0.55-0.649 | 0.8 |
| 12 | 3.5 | 3.15 | 0.75 | 0.65-0.749 | 0.9 |
| 13 | 3.5 | 3.5 | 0.85 | 0.75-0.849 | 1.0 |

TABLE VIII-continued

| Embodiment | D (m) | x2 (m) | Mf | Me | FR4 |
|---|---|---|---|---|---|
| 14 | 3.5 | 7.0 | 0.55 | 0.45-0.549 | 2.0 |
| 15 | 7.5 | 7.5 | 0.55 | 0.45-0.549 | 1.0 |
| 16 | 7.5 | 11.25 | 0.75 | 0.65-0.749 | 1.5 |
| 17 | 7.5 | 15.0 | 0.95 | 0.85-0.949 | 2.0 |

The fourth flow ratio (FR4) is used to position the unducted turbine engine with respect to the tail wing to achieve the desired inlet airflow Mach number (Mi) for a specific freestream airflow Mach number (Mf). Further, through the ratios described, various geometric characteristics of the divot and/or the unducted turbine engine are able to be calculated if one or more geometric characteristics are known. For example, if the size (e.g., the diameter (D)) of the unducted turbine engine is known, the fourth flow ratio (FR4) is able to be used to calculate the second distance (x2) for a given freestream airflow Mach number (Mf).

A fifth flow ratio (FR5), a sixth flow ratio (FR6), and a seventh flow ratio (FR7) are defined by the following, respectively:

$$FR5 = \frac{w1}{D}$$

$$FR6 = \frac{w2}{D}$$

$$FR7 = \frac{w3}{D}$$

The fifth flow ratio (FR5) is greater than or equal to 0.1 and less than or equal to 1 ($0.1 \leq FR5 \leq 1$). The sixth flow ratio (FR6) is greater than or equal to 0.1 and less than or equal to 1 ($0.1 \leq FR6 \leq 1$). The seventh flow ratio (FR7) is greater than or equal to 0.1 and less than or equal to 1 ($0.1 \leq FR7 \leq 1$). TABLE IX illustrates the fifth flow ratio (FR5), the sixth flow ratio (FR6) and the seventh flow ratio (FR7) using the embodiments from TABLE III.

TABLE IX

| Embodiment | D (m) | w1 (m) | w2 (m) | w3 (m) | Mf | Me | FR5 | FR6 | FR7 |
|---|---|---|---|---|---|---|---|---|---|
| 18 | 3.2 | 0.25 | 0.25 | 0.25 | 0.55 | 0.45-0.549 | 0.351 | 0.81 | 0.51 |
| 19 | 3.2 | 1.12 | 2.56 | 1.6 | 0.55 | 0.45-0.549 | 0.335 | 0.78 | 0.355 |
| 20 | 3.2 | 0.96 | 2.24 | 1.12 | 0.65 | 0.55-0.649 | 0.253 | 0.67 | 0.2535 |
| 21 | 3.2 | 0.8 | 1.92 | 0.8 | 0.75 | 0.65-0.749 | 0.25 | 0.6 | 0.25 |
| 22 | 3.2 | 0.64 | 1.6 | 0.32 | 0.85 | 0.75-0.849 | 0.2 | 0.5 | 0.1 |
| 23 | 3.2 | 3.2 | 3.2 | 3.2 | 0.95 | 0.85-0.949 | 1.0 | 1.0 | 1.0 |
| 24 | 5.0 | 0.5 | 0.5 | 0.5 | 0.55 | 0.45-0.549 | 0.1 | 0.1 | 0.1 |
| 25 | 5.0 | 2.5 | 2.5 | 2.5 | 0.75 | 0.65-0.749 | 0.5 | 0.5 | 0.5 |
| 26 | 5.0 | 5.0 | 5.0 | 5.0 | 0.95 | 0.85-0.949 | 1.0 | 1.0 | 1.0 |

The fifth flow ratio (FR5), the sixth flow ratio (FR6) and the seventh flow ratio (FR7) are used to position the unducted turbine engine with respect to the tail wing and the divot to achieve the desired inlet airflow Mach number (Mi) for a specific freestream airflow Mach number (Mf). Further, through the ratios described, various geometric characteristics of the divot and/or the unducted turbine engine are able to be calculated if one or more geometric characteristics are known. For example, if the size (e.g., the diameter (D)) of the unducted turbine engine is known, the fifth flow ratio (FR5), the sixth flow ratio (FR6) and the seventh flow ratio (FR7) are able to be used to calculate the first radial distance (w1), the second radial distance (w2) and the third radial distance (w3), respectively, for a given freestream airflow Mach number (Mf).

An eighth flow ratio (FR8) is defined by the following:

$$FR8 = \frac{w4}{D}$$

The eighth flow ratio (FR8) is greater than or equal to 0.55 and less than or equal to 1.55 ($0.55 \leq FR8 \leq 1.55$). In summary, TABLE X illustrates the eighth flow ratio (FR8) using the embodiments of TABLE V.

TABLE X

| Embodiment | D (m) | w4 (m) | Mf | Me | FR8 |
|---|---|---|---|---|---|
| 31 | 4.55 | 2.455 | 0.55 | 0.45-0.549 | 0.55 |
| 32 | 3.5 | 3.5 | 0.65 | 0.55-0.649 | 1 |
| 33 | 3.5 | 4.03 | 0.75 | 0.65-0.749 | 1.15 |
| 34 | 3.5 | 4.38 | 0.85 | 0.75-0.849 | 1.25 |
| 35 | 3.5 | 5.43 | 0.95 | 0.85-0.949 | 1.55 |
| 36 | 7.74 | 4.26 | 0.55 | 0.45-0.549 | 0.55 |
| 37 | 7.74 | 9.0 | 0.75 | 0.65-0.749 | 1.16 |
| 38 | 7.74 | 12.0 | 0.95 | 0.85-0.949 | 1.55 |

The eighth flow ratio (FR8) is used to position the unducted turbine engine with respect to the tail wing to achieve the desired inlet airflow Mach number (Mi) for a specific freestream airflow Mach number (Mf). Further, through the ratios described, various geometric characteristics of the divot and/or the unducted turbine engine are able to be calculated if one or more geometric characteristics are known. For example, if the size (e.g., the diameter (D)) of the unducted turbine engine is known, the eight flow ratio (FR8) is able to be used to calculate the fourth radial distance (w4) for a given freestream airflow Mach number (Mf).

A ninth flow ratio (FR9) and a tenth flow ratio (FR10) are defined by the following, respectively:

$$FR9 = \frac{x3}{D}$$

$$FR10 = \frac{x4}{D}$$

The ninth flow ratio (FR9) is greater than or equal to 0.1 and less than or equal to 1 ($0.1 \leq FR9 \leq 1$). The tenth flow ratio (FR10) is greater than or equal to 0.11 and less than or equal to 0.5 ($0.11 \leq FR10 \leq 0.5$). In summary, TABLE XI illustrates the ninth flow ratio (FR9) and the tenth flow ratio (FR10) using the embodiments of TABLE VI.

TABLE XI

| Embodiment | D (m) | x3 (m) | x4 (m) | Mf | Me | FR9 | FR10 |
|---|---|---|---|---|---|---|---|
| 39 | 2.5 | 0.25 | 0.4 | 0.75 | 0.65-0.749 | 0.1 | 0.16 |
| 40 | 3.5 | 0.35 | 0.4 | 0.65 | 0.55-0.649 | 0.1 | 0.11 |
| 41 | 3.5 | 0.7 | 0.53 | 0.55 | 0.45-0.549 | 0.2 | 0.15 |
| 42 | 3.5 | 1.4 | 0.88 | 0.65 | 0.55-0.649 | 0.4 | 0.25 |
| 43 | 3.5 | 2.1 | 1.23 | 0.75 | 0.65-0.749 | 0.6 | 0.35 |
| 44 | 3.5 | 2.8 | 1.58 | 0.85 | 0.75-0.849 | 0.8 | 0.45 |
| 45 | 3.5 | 3.5 | 1.75 | 0.95 | 0.85-0.949 | 1.0 | 0.5 |
| 46 | 8.0 | 6.0 | 4.0 | 0.85 | 0.75-0.849 | 0.75 | 0.5 |
| 47 | 10.0 | 10.0 | 4.0 | 0.85 | 0.75-0.849 | 1.0 | 0.4 |

The ninth flow ratio (FR9) and the tenth flow ratio (FR10) are used to position the unducted turbine engine with respect to the tail wing and the pylon to achieve the desired inlet airflow Mach number (Mi) for a specific freestream airflow Mach number (Mf). Further, through the ratios described, various geometric characteristics of the divot and/or the unducted turbine engine are able to be calculated if one or more geometric characteristics are known. For example, if the size (e.g., the diameter (D)) of the unducted turbine engine is known, the ninth flow ratio (FR9) and the tenth flow ratio (FR10) are able to be used to calculate the third distance (x3) and the fourth distance (x4), respectively, for a given freestream airflow Mach number (Mf).

The ranges of the first flow ratio (FR1), the second flow ratio (FR2), the third flow ratio (FR3), the fourth flow ratio (FR4), the fifth flow ratio (FR5), the sixth flow ratio (FR6), the seventh flow ratio (FR7), the eight flow ratio (FR8), the ninth flow ratio (FR9), and the tenth flow ratio (FR10) are used together, or independently of one another, to define the size and shape of the divot, and the size and placement of the unducted turbine engine with respect to various portions of the divot, the unducted turbine engine and/or the tail wing. This, in turn, is used to reduce the inlet airflow Mach number (Mi) with respect to the freestream airflow Mach number (Mf). This ultimately results in a lower TSFC and a more efficient engine without sacrificing the overall thrust of the unducted turbine engine.

Benefits associated with the aircraft and the flow ratios described herein include a greater ease in design when compared to the design of a conventional aircraft including an unducted turbine engine. For example, the conventional aircraft is designed through the time-consuming, costly and iterative process described previously. The iterative process is not guaranteed to produce an aircraft that falls within the required TSFC or thrust of the unducted turbine engine. The flow ratios as described herein, however, always results in an aircraft that falls within the desired TSFC and overall thrust of the unducted turbine engine as measured by the reduction of the inlet airflow Mach number with respect to the freestream airflow Mach number.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An aircraft comprising a fuselage defining a fuselage centerline, the fuselage comprising a divot having an upstream edge and a downstream edge axially aft of the upstream edge with respect to the fuselage centerline, wherein the divot is defined by a straight reference line connecting the upstream edge and the downstream edge, with the straight reference line extending a length (L), and the divot having a maximum depth (h) relative to the straight reference line, and an unducted turbine engine operably coupled to the fuselage, the unducted turbine engine comprising an engine core defining an engine centerline, a nacelle circumscribing at least a portion of the engine core, and a set of blades operably coupled to at least a portion of the engine core, the set of blades having an axially forwardmost point and wherein the set of blades defining a swept area defining a circle having a diameter (D), wherein a first flow ratio (FR1) of the aircraft is equal to:

$$\frac{h}{L},$$

and wherein the first flow ratio (FR1) is greater than or equal to 0.01 and less than or equal to 0.15 (0.01≤FR1≤0.15).

An aircraft comprising a fuselage defining a fuselage centerline, a tail wing coupled to the fuselage and having a leading edge, with an axially forwardmost point relative to the fuselage centerline, an unducted turbine engine operably coupled to the fuselage, the unducted turbine engine comprising an engine core defining an engine centerline, a nacelle circumscribing at least a portion of the engine core, and a set of blades operably coupled to at least a portion of the engine core, the set of blades having an axially forwardmost point, wherein the set of blades define a swept area defining a circle having a diameter (D), wherein a second distance (x2) is a distance along a line parallel to the fuselage centerline between the axially forwardmost point of the leading edge of the tail wing and the axially forwardmost point of the set of blades, wherein a flow ratio (FR4) is equal to:

$$\frac{x2}{D},$$

and wherein the flow ratio (FR4) is greater than or equal to 0.5 and less than or equal to 2 (0.5≤FR4≤2).

The aircraft of any preceding clause, wherein a second flow ratio (FR2) is equal to:

$$\frac{L}{D},$$

and the second flow ratio (FR2) is greater than or equal to 0.6 and less than or equal to 4 (0.6≤FR2≤7).

The aircraft of any preceding clause, wherein a first distance (x1) is a distance along a line parallel to the fuselage centerline and between the axially forwardmost point of the set of blades and the upstream edge of the divot, and a third flow ratio (FR3) is equal to:

$$\frac{x1}{L},$$

and the third flow ratio (FR3) is greater than or equal to 0.25 and less than or equal to 0.75 (0.25≤FR3≤0.75).

The aircraft of any preceding clause, further comprising a pylon defining a pylon centerline and coupling the fuselage and the unducted turbine engine, wherein the pylon centerline defines a roll angle ($\alpha$) with a horizontal plane, and wherein the roll angle ($\alpha$) is greater than or equal to 0 degrees and less than or equal to 45 degrees (0°≤$\alpha$≤45°).

The aircraft of claim 4, wherein at least a portion of the pylon intersects the divot.

The aircraft of any preceding clause, wherein a first radial distance (w1) is a distance along the pylon centerline between an outer boundary of the circle and the fuselage, a fifth flow ratio (FR5) is equal to:

$$\frac{w1}{D},$$

and the fifth flow ratio (FR5) is greater than or equal to 0.1 and less than or equal to 1 (0.1≤FR5≤1). The aircraft of any preceding clause, wherein a fourth distance (x4) is the distance between the axially forwardmost point and the intersection point when viewed along a vertical plane extending along the engine centerline, a tenth flow ratio (FR10) is equal to:

$$\frac{x4}{D},$$

and the tenth flow ratio (FR10) is greater than or equal to 0.1 and less than or equal to 0.5 (0.1≤FR10≤0.5).

The aircraft of any preceding clause, further comprising a tail wing having a leading edge, which includes an axially forwardmost point with respect to the fuselage centerline.

The aircraft of any preceding clause, wherein a second distance (x2) is a distance along a line parallel to the fuselage centerline between the axially forwardmost point for the set of fan blades and the axially forwardmost point for the leading edge of the tail wing, a fourth flow ratio (FR4) is equal to:

$$\frac{x2}{D},$$

and the fourth flow ratio (FR4) is greater than or equal to 0.5 and less than or equal to 2 (0.5≤FR4≤2).

The aircraft of any preceding clause, wherein the tail wing comprises a tail wing pylon extending between the tail wing and the fuselage, and wherein a second radial distance (w2) is the shortest radial distance between an exterior of the tail wing pylon and an outer boundary of the circle along a horizontal plane passing through the engine centerline, and a sixth flow ratio (FR6) is equal to:

$$\frac{w2}{D},$$

and wherein the sixth flow ratio (FR6) is greater than or equal to 0.1 and less than or equal to 1 (0.1≤FR6≤1).

The aircraft of any preceding clause, wherein a third radial distance (w3) is the shortest radial distance between an exterior of the tail wing and the boundary of the circle along the horizontal plane, and a seventh flow ratio (FR7) is equal to:

$$\frac{w3}{D},$$

and the seventh flow ratio (FR7) is greater than or equal to 0.1 and less than or equal to 1 (0.1≤FR7≤1).

The aircraft of any preceding clause, wherein a fourth radial distance (w4) is the shortest radial distance between an exterior of the tail wing and the engine centerline, an eighth flow ratio (FR8) is equal to:

$$\frac{w4}{D},$$

and the eighth flow ratio (FR8) is greater than or equal to 0.55 and less than or equal to 1.5 (0.55≤FR8≤1.55).

The aircraft of any preceding clause, wherein a third distance (x3) is the axial distance between the axially forwardmost point and a point where the engine centerline intersects the leading edge of the tail wing, a ninth flow ratio (FR9) is equal to:

$$\frac{x3}{D},$$

and the ninth flow ratio (FR9) is greater than or equal to 0.1 and less than or equal to 1 (0.1≤FR9≤1).

The aircraft of any preceding clause, wherein the divot is non-symmetric about a vertical plane perpendicular to the fuselage centerline and intersecting the maximum depth.

The aircraft of any preceding clause, wherein the engine centerline is parallel to the fuselage centerline.

The aircraft of any preceding clause, wherein the straight reference line extends non-parallel to the fuselage centerline.

The aircraft of any preceding clause, wherein during operation of the aircraft and the unducted turbine engine an inlet airflow flows against the axially forwardmost point of the set of blades, and the inlet airflow includes a Mach number that is between 0.001 and 0.1 smaller than a Mach number of a freestream airflow along the fuselage upstream of the unducted turbine engine.

The aircraft of any preceding clause, wherein during operation of the aircraft and the unducted turbine engine a freestream airflow flows along the fuselage upstream of the unducted turbine engine, and wherein the unducted turbine engine operates at a cruise speed Mach number of the freestream airflow greater than or equal to 0.55 and less than or equal to 0.95.

The aircraft of any preceding clause, wherein during operation of the aircraft and the unducted turbine engine an inlet airflow flows against the axially forwardmost point of the set of blades, and the inlet airflow includes a Mach number that is between 0.001 and 0.1 smaller than a Mach number of a freestream airflow along the fuselage upstream of the unducted turbine engine.

What is claimed is:
1. An aircraft comprising:
a fuselage defining a fuselage centerline, the fuselage comprising:
   a divot having an upstream edge and a downstream edge axially aft of the upstream edge with respect to the fuselage centerline;
   wherein the divot is defined by a straight reference line connecting the upstream edge and the downstream edge, with the straight reference line extending a length (L) greater than or equal to 6 m and less than or equal to 20 m, and the divot having a maximum depth (h) greater than or equal to 0.06 m and less than or equal to 3 m, the maximum depth (h) being relative to the straight reference line; and
an unducted turbine engine operably coupled to the fuselage, the unducted turbine engine comprising:
   an engine core defining an engine centerline;
   a nacelle circumscribing at least a portion of the engine core; and
   a set of blades operably coupled to at least a portion of the engine core, the set of blades having an axially forwardmost point and wherein the set of blades defining a swept area defining a circle having a diameter (D);
wherein a first flow ratio (FR1) of the aircraft is equal to:

$$\frac{h}{L};$$

and
wherein the first flow ratio (FR1) is greater than or equal to 0.01 and less than or equal to 0.15 (0.01≤FR1≤0.15).
2. The aircraft of claim 1, wherein:
the diameter (D) is greater than or equal to 2 m and less than or equal to 10 m; and
a second flow ratio (FR2) is equal to:

$$\frac{L}{D},$$

and the second flow ratio (FR2) is greater than or equal to 0.6 and less than or equal to 4 (0.6≤FR2≤4).
3. The aircraft of claim 1, wherein:
a first distance (x1) is a distance along a line parallel to the fuselage centerline and between the axially forwardmost point of the set of blades and the upstream edge of the divot, the first distance (x1) being greater than or equal to 1.5 m and less than or equal to 15 m; and
a third flow ratio (FR3) is equal to $$\frac{x1}{L},$$

and the third flow ratio (FR3) is greater than or equal to 0.25 and less than or equal to 0.75 (0.25≤FR3≤0.75).
4. The aircraft of claim 1, further comprising:
a pylon defining a pylon centerline and coupling the fuselage and the unducted turbine engine;
wherein the pylon centerline defines a roll angle ($\alpha$) with a horizontal plane; and
wherein the roll angle ($\alpha$) is greater than or equal to 0 degrees and less than or equal to 45 degrees (0°≤$\alpha$≤45°).
5. The aircraft of claim 4, wherein at least a portion of the pylon intersects the divot.
6. The aircraft of claim 4, wherein:
a first radial distance (w1) is a distance along the pylon centerline between an outer boundary of the circle and the fuselage, the first radial distance (w1) being greater than or equal to 0.25 m and less than or equal to 5 m; and
a fifth flow ratio (FR5) is equal to:

$$\frac{w1}{D},$$

the fifth flow ratio (FR5) is greater than or equal to 0.1 and less than or equal to 1 (0.1≤FR5≤1).
7. The aircraft of claim 1, wherein:
a fourth distance (x4) is the distance between the axially forwardmost point and an intersection point when viewed along a vertical plane extending along the engine centerline, the fourth distance (x4) being greater than or equal to 0.4 m and less than or equal to 4 m; and
a tenth flow ratio (FR10) is equal to:

$$\frac{w4}{D},$$

the tenth flow ratio (FR10) is greater than or equal to 0.1 and less than or equal to 0.5 (0.11≤FR10≤0.5).
8. The aircraft of claim 1, further comprising a tail wing having a leading edge, which includes an axially forwardmost point with respect to the fuselage centerline.
9. The aircraft of claim 8, wherein:
a second distance (x2) is a distance along a line parallel to the fuselage centerline between the axially forwardmost point for the set of fan blades and the axially forwardmost point for the leading edge of the tail wing, the second distance (x2) being greater than or equal to 1.5 m and less than or equal to 15 m; and
a fourth flow ratio (FR4) is equal to:

$$\frac{x2}{D};$$

the fourth flow ratio (FR4) is greater than or equal to 0.5 and less than or equal to 2 (0.43≤FR4≤2).
10. The aircraft of claim 8, wherein the tail wing comprises a tail wing pylon extending between the tail wing and the fuselage, and wherein:
a second radial distance (w2) is the shortest radial distance between an exterior of the tail wing pylon and an outer boundary of the circle along a horizontal plane passing through the engine centerline, the second radial distance (w2) being greater than or equal to 0.25 m and less than or equal to 5 m; and a sixth flow ratio (FR6) is equal to:

$$\frac{w2}{D},$$

the sixth flow ratio (FR6) is greater than or equal to 0.1 and less than or equal to 1 (0.1≤FR6≤1).

11. The aircraft of claim 10, wherein:
a third radial distance (w3) is the shortest radial distance between an exterior of the tail wing and the boundary of the circle along the horizontal plane, the third radial distance (w3) being greater than or equal to 0.25 m and less than or equal to 5 m; and
a seventh flow ratio (FR7) is equal to:

$$\frac{w3}{D},$$

and the seventh flow ratio (FR7) is greater than or equal to 0.1 and less than or equal to 1 (0.1≤FR7≤1).

12. The aircraft of claim 8, wherein:
a fourth radial distance (w4) is the shortest radial distance between an exterior of the tail wing and the engine centerline, the fourth radial distance (w4) being greater than or equal to 2.5 m and less than or equal to 12 m; and
an eighth flow ratio (FR8) is equal to:

$$\frac{w4}{D},$$

the eighth flow ratio (FR8) is greater than or equal to 0.55 and less than or equal to 1.5 (0.55≤FR8≤1.55).

13. The aircraft of claim 8, wherein:
a third distance (x3) is the axial distance between the axially forwardmost point and a point where the engine centerline intersects the leading edge of the tail wing, third distance (x3) being greater than or equal to 0.25 m and less than or equal to 10 m; and
a ninth flow ratio (FR9) is equal to:

$$\frac{x3}{D},$$

the ninth flow ratio (FR9) is greater than or equal to 0.1 and less than or equal to 1 (0.1≤FR9≤1).

14. The aircraft of claim 1, wherein the divot is non-symmetric about a vertical plane perpendicular to the fuselage centerline and intersecting the maximum depth.

15. The aircraft of claim 1, wherein the unducted turbine engine is directly connected to one of the fuselage, a wing of the aircraft, or a tail wing of the aircraft.

16. The aircraft of claim 1, wherein during operation of the aircraft and the unducted turbine engine an inlet airflow flows against the axially forwardmost point of the set of blades, and the inlet airflow includes a Mach number that is between 0.001 and 0.1 smaller than a Mach number of a freestream airflow along the fuselage upstream of the unducted turbine engine.

17. The aircraft of claim 1, wherein during operation of the aircraft and the unducted turbine engine a freestream airflow flows along the fuselage upstream of the unducted turbine engine, and wherein the unducted turbine engine operates at a cruise speed Mach number of the freestream airflow greater than or equal to 0.55 and less than or equal to 0.95.

18. An aircraft comprising:
a fuselage defining a fuselage centerline;
a tail wing coupled to the fuselage and having a leading edge, with an axially forwardmost point relative to the fuselage centerline;
an unducted turbine engine operably coupled to the fuselage, the unducted turbine engine comprising:
an engine core defining an engine centerline;
a nacelle circumscribing at least a portion of the engine core; and
a set of blades operably coupled to at least a portion of the engine core, the set of blades having an axially forwardmost point;
wherein the set of blades define a swept area defining a circle having a diameter (D) being greater than or equal to 2 m and less than or equal to 10 m;
wherein a second distance (x2) is a distance along a line parallel to the fuselage centerline between the axially forwardmost point of the leading edge of the tail wing and the axially forwardmost point of the set of blades, the second distance being greater than or equal to 1.5 m and less than or equal to 15 m;
wherein a flow ratio (FR4) is equal to:

$$\frac{x2}{D};$$

and
wherein the flow ratio (FR4) is greater than or equal to 0.5 and less than or equal to 2 (0.43≤FR4≤2).

19. The aircraft of claim 18, wherein during operation of the aircraft and the unducted turbine engine an inlet airflow flows against the axially forwardmost point of the set of blades, and the inlet airflow includes a Mach number that is between 0.001 and 0.1 smaller than a Mach number of a freestream airflow along the fuselage upstream of the unducted turbine engine.

20. The aircraft of claim 18, wherein the unducted turbine engine is directly connected to one of the fuselage, a wing of the aircraft, or the tail wing.

* * * * *